US011868472B2

(12) United States Patent
Hatekar et al.

(10) Patent No.: US 11,868,472 B2
(45) Date of Patent: Jan. 9, 2024

(54) MALICIOUS PATTERN IDENTIFICATION IN CLUSTERS OF DATA ITEMS

(71) Applicant: Microsoft Technology Licensing, LLC, Redmond, WA (US)

(72) Inventors: Abhijeet Surendra Hatekar, Kirkland, WA (US); Jonathan Ray Armer, Covington, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 77 days.

(21) Appl. No.: 17/217,750

(22) Filed: Mar. 30, 2021

(65) Prior Publication Data
US 2022/0318384 A1 Oct. 6, 2022

(51) Int. Cl.
G06F 21/56 (2013.01)
G06F 21/55 (2013.01)
G06F 18/23 (2023.01)
H04L 29/06 (2006.01)

(52) U.S. Cl.
CPC ............ G06F 21/564 (2013.01); G06F 18/23 (2023.01); G06F 21/552 (2013.01)

(58) Field of Classification Search
CPC ...... G06F 21/564; G06F 21/552; G06F 21/55; G06F 21/56; G06K 9/6218; H04L 9/40
See application file for complete search history.

(56) References Cited

U.S. PATENT DOCUMENTS

| 7,882,561 | B2* | 2/2011 | Costea | G06F 21/564 |
| | | | | 713/188 |
| 10,691,664 | B1* | 6/2020 | Yap | G06F 3/0481 |
| 11,075,930 | B1* | 7/2021 | Xavier | H04L 63/1425 |
| 2017/0310694 | A1* | 10/2017 | Kamiya | G06F 21/561 |
| 2018/0018387 | A1* | 1/2018 | Astiz | H04L 51/42 |
| 2018/0052918 | A1* | 2/2018 | Gu | G06F 16/35 |
| 2019/0372934 | A1* | 12/2019 | Yehudai | G06K 9/6221 |
| 2020/0117802 | A1* | 4/2020 | Spurlock | H04L 63/145 |
| 2020/0314120 | A1* | 10/2020 | Dedenok | H04L 51/18 |
| 2022/0109649 | A1* | 4/2022 | Korotkikh | G06F 18/24133 |

FOREIGN PATENT DOCUMENTS

EP 3370183 A1 9/2018

OTHER PUBLICATIONS

"International Search Report and Written Opinion Issued in PCT Application No. PCT/US22/020104", dated Jun. 24, 2022, 12 Pages.
Zobal, et al., "Exploring Current E-mail Cyber Threats using Authenticated SMTP Honeypot", In Proceedings of the 17th International Joint Conference on e-Business and Telecommunications, Jul. 8, 2020, pp. 253-262.

* cited by examiner

Primary Examiner — Evans Desrosiers
(74) Attorney, Agent, or Firm — Mannava & Kang, P.C.

(57) ABSTRACT

According to examples, an apparatus may include a processor may identify features in a plurality of data items, determine similarities and/or patterns in the identified features, and group the plurality of data items into a plurality of clusters of data items based on the determined similarities and/or patterns in the identified features in the plurality of data items. The processor may also evaluate the plurality of clusters to identify a potentially malicious pattern among the data items in the plurality of clusters. In addition, the processor may, based on a potentially malicious pattern being identified in a generated cluster of the generated clusters, execute an action with regard to the data items in the generated cluster.

20 Claims, 5 Drawing Sheets

MALICIOUS PATTERN IDENTIFICATION IN CLUSTERS OF DATA ITEMS

BACKGROUND

Millions of data items, such as emails, text messages, social media posts, etc., are communicated over the Internet every minute of every day. Malicious users may target the data items in attempting to infect computing systems with malware or to gain access to networks through phishing attacks. For instance, attackers may use various techniques to attempt to lure users into opening links or attachments in the data items to install the malware on their computers or to access their private information, such as user names, passwords, social security numbers, credit card numbers, and/or the like.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
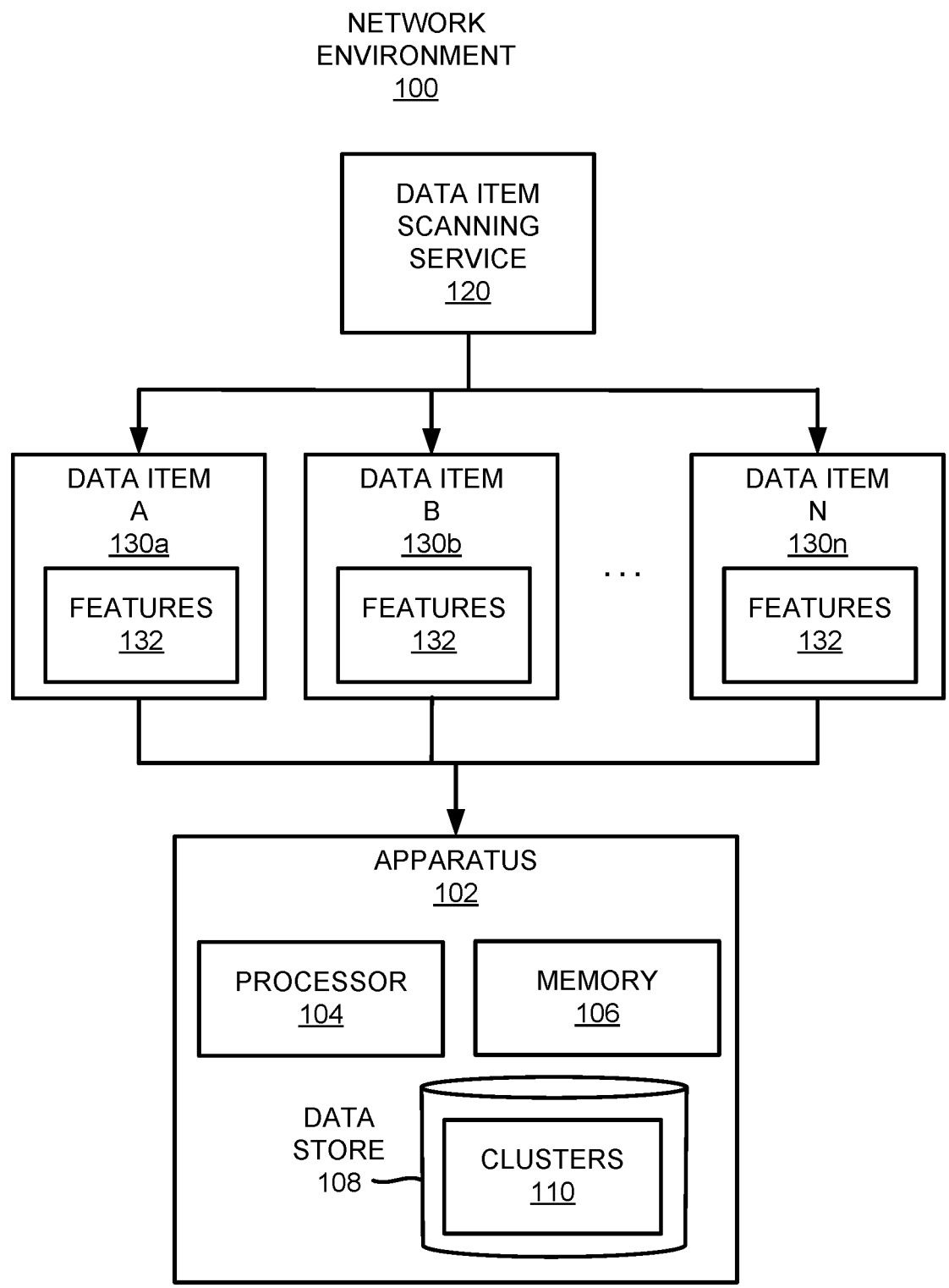
FIG. 1 shows a block diagram of a network environment, in which an apparatus may generate clusters of data items, determine whether a potentially malicious pattern is identified in the generated clusters, and determine and execute an action with regard to the data items based on a determination that a potentially malicious pattern has been identified, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, apparatuses, methods, and computer-readable media in which a processor may determine whether a potentially malicious pattern is identified in clusters of data items. Particularly, for instance, the processor may identify features in data items, in which the features may be featurizations and/or hashes of the features. The processor may determine similarities and/or patterns in the features and may group the data items into clusters based on the similarities and/or patterns of the features in the data items. In some examples, the data items may be categorized into event hubs that may organize the data items according to the types of data included in the data items. In these examples, the processor may apply various clustering logic on the data items in the various event hubs to cluster the data items in the event hubs, which may enable more accurate groupings of the data items into the clusters.

The processor may evaluate the clusters to determine whether any of the clusters include data items that correspond to a potentially malicious pattern. For instance, the processor may determine that at least a predefined number of data items in a particular cluster include a common feature, e.g., a common sender, a common host domain of senders of the data items, a common link to a website, and/or the like. In some instances, the data item scanning service 120 may not have determined that the data items themselves include malware or a phishing attack. Instead, the processor may make this type of determination from an analysis of multiple data items in the clusters.

In instances in which the processor determines that a potentially malicious pattern has been identified among a plurality of data items in a cluster, the processor may execute an action. The action may be to output a notification to request that additional analysis be performed on the data items to make a determination as to whether the potentially malicious pattern is likely malicious. In addition, or alternatively, the processor may remove the data items in the cluster from a device of a recipient or from multiple devices of recipients of the data items in the cluster. The processor may further update an antivirus service with characteristics of the potentially malicious pattern such that the antivirus service may identify additional data items as potentially being malicious as the service receives the additional data items.

A technological issue with known malware detection may be that some security issues may not be identified from analysis of individual data items. In addition, known clustering techniques may be overly broad and may not use policies that may be directed to different types of data items and thus, the data items may not be grouped into the clusters such that the potentially malicious patterns may properly and/or efficiently be determined. Through implementation of various features of the present disclosure, a processor may analyze clusters of data items to identify potentially malicious patterns among the data items grouped in the clusters. In addition, the processor may group the data items into clusters corresponding to various event hubs using various clustering logic that may be tuned for the types of data items in the various event hubs. As a result, the various features of the present disclosure may enable a processor to accurately and efficiently identify potentially malicious patterns and to take actions on the data items based on the identification of the potentially malicious patterns, which may improve malware threat detection and mitigation and thus security on computing devices.

Figure 2:
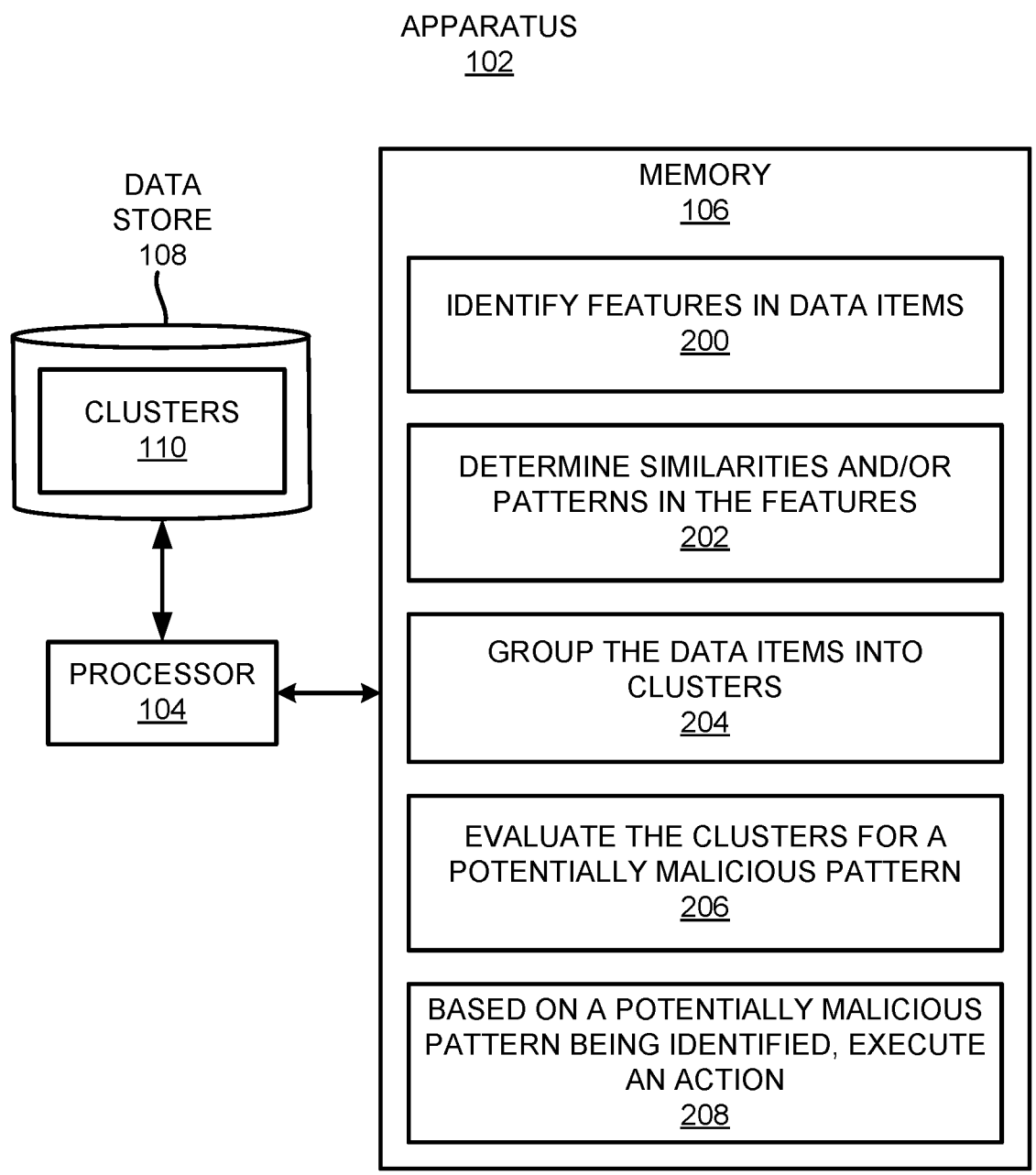
FIG. 2 depicts a block diagram of the apparatus depicted in FIG. 1, in accordance with an embodiment of the present disclosure.
Figure 3:
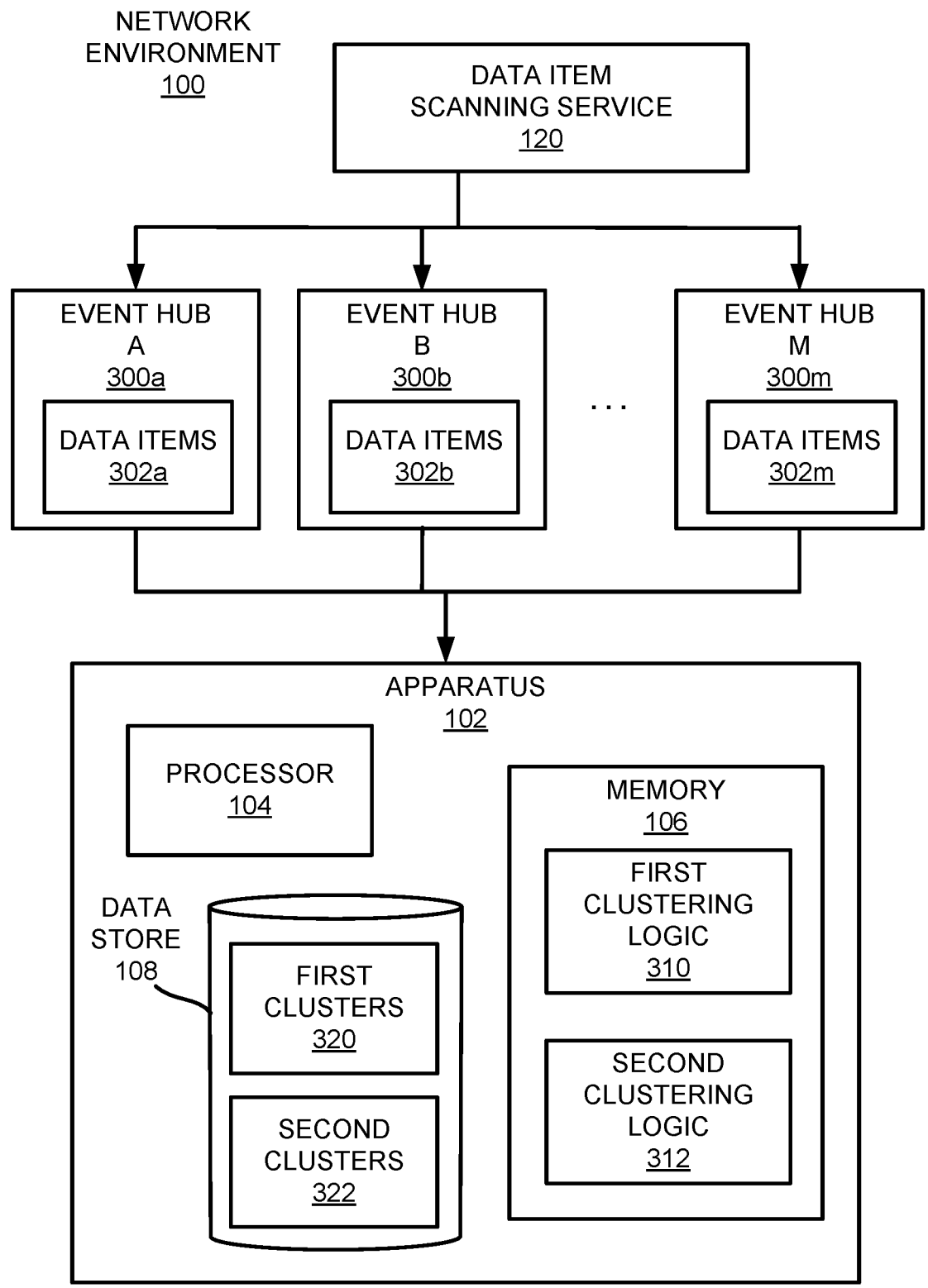
FIG. 3 depicts a block diagram of the network environment depicted in FIG. 1, in accordance with another embodiment of the present disclosure.

Reference is first made to FIGS. 1-3. FIG. 1 shows a block diagram of a network environment 100, in which an apparatus 102 may generate clusters of data items, determine whether a potentially malicious pattern is identified in the generated clusters, and determine and execute an action with regard to the data items based on a determination that a potentially malicious pattern has been identified, in accordance with an embodiment of the present disclosure. FIG. 2 depicts a block diagram of the apparatus 102 depicted in FIG. 1, in accordance with an embodiment of the present disclosure. FIG. 3 shows a block diagram of the network environment 100 depicted in FIG. 1, in accordance with another embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

As shown in FIG. 1, the network environment 100 may include the apparatus 102 and a data item scanning service 120. The apparatus 102 may be a server or other type of computing device, e.g., a network gateway, an access point, or the like. In some examples, the functions of the apparatus 102 may be distributed across multiple computing devices, e.g., servers. The data item scanning service 120 may be a service that may be implemented in a server, gateway, and/or the like and that may perform anti-virus operations on incoming data items 130a-130n, in which the variable "n" may represent a value greater than one. The data item scanning service 120 may also perform threat detection, spyware detection, intrusion prevention, and/or the like. In some examples, the data item scanning service 120 may execute on a server or other computing device that may be separate from the apparatus 102, while in other examples, the data item scanning service 120 may execute on the apparatus 102.

The data items 130a-130n may be various types of data items that users may communicate to each other. For instance, the data items 130a-130n may be emails, text messages, group chats, social media posts, and/or the like. Some of the users may be members of an organization and the data item scanning service 120 may intercept the data items 130a-130n as they are received inside of the organization. The organization may be a corporation, an educational institution, a government agency, and/or the like. In some examples, the data item scanning service 120 may receive the data items 130a-130n and may forward the received data items 130a-130n to their intended recipients. In other examples, the data items 130a-130n may be directed to both the intended recipients, e.g., the recipients to which the data items 130a-13n are addressed, and the data item scanning service 120 concurrently.

As also shown in FIG. 1, the apparatus 102 may obtain or otherwise access the data items 130a-130n. The apparatus 102 may obtain the data items 130a-130n directly from the data item scanning service 120 or from another source. In the latter example, the data item scanning service 120 may, for instance, store the data items 130a-130n in a data store (not shown) from which the apparatus 102 may retrieve the data items 130a-130n.

In some examples, the data item scanning service 120 may flag those data items 130a-130n that the data item scanning service 120 has identified as being suspicious, e.g., potentially malicious, a potential phishing attack, a denial of service attack, and/or the like. Thus, for instance, the data items 130a-130n identified as being suspicious may be forwarded to their recipients with the flags and/or these data items 130a-130n may be removed and may thus be prevented from being forwarded to their intended recipients. In some examples, the apparatus 102 may obtain the data items 130a-130n that the data item scanning service 120 may not have identified as being suspicious. In addition, the apparatus 102 may analyze the data items 130a-130n in a sandbox environment, which may be an environment in which the data items 130a-130n may be isolated from other components within a network.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-208 that the processor 104 may execute. Although the instructions 200-208 are described herein as being stored on the memory 106 and may thus include a set of machine-readable instructions, the apparatus 102 may include hardware logic blocks that may perform functions similar to the instructions 200-208. For instance, the processor 104 may include hardware components that may execute the instructions 200-208. In other examples, the apparatus 102 may include a combination of instructions and hardware logic blocks to implement or execute functions corresponding to the instructions 200-208. In any of these examples, the processor 104 may implement the hardware logic blocks and/or execute the instructions 200-208. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify features 132 in the data items 130a-130n. Particularly, the processor 104 may identify the features 132 in the respective data items 130a-130n. The features 132 may include any of, for instance, a count of attachments in a data item 130, a user/client that sent the data item 130a, an IP space from which the data item 130a was sent, the subject of the data item 130a, a header in the data item 130a, contents in a body of the data item 130a, a footer of the data item 130a, contents in an attachment of the data item 130a, a size of an attachment of the data item 130a, a uniform resource locator (URL) link in the data item 130a, a domain of the URL, the length of time from when the URL was registered, a host of the URL, whether an document includes a macro, a screenshot of an attachment, a number of words included in an attachment, a date and time at which the data item 130a was received, and/or the like. According to examples, the processor 104 may featurize some or all of the features 132 of the data items 130a-130n. For instance, the processor 104 may featurize the features 132 through application of any suitable technique to convert the features 132 from text to another form, such as numerical vectors.

According to examples, the features 132 may be hashes of the features 132. In these examples, the data item scanning service 120 may hash some of the features 132 to, for instance, map the features 132 to have fixed-size values through implementation of any suitable hashing operation. The hashing of the features 132 may make analysis and comparisons of the features 132 less complex.

In some examples, the processor 104 may identify the features 132 in the data items 130a-130n that were received within predefined windows of time. Particularly, for instance, the processor 104 may identify the data items 130a-130n that were received during a certain window of time, e.g., within a 30 minute window. As other examples, the processor 104 may identify the data items 130a-130n within hopping windows. In these examples, the processor 104 may, at certain intervals of time, e.g., every 10 minutes, identify the data items 130a-130n that were received during a previous duration of time, e.g., 30 minutes. In this manner, the processor 104 may analyze the data items 130a-130n on a rolling cycle, which may enable the processor 104 to identify potentially malicious data items 130a-130n shortly after the data items 130a-130n have been received.

In some examples, and as shown in FIG. 3, the data items 130a-130n may be categorized into event hubs 300a-300m, in which the variable "m" may be a value greater than one. As discussed herein, the processor 104 may identify the features 132 as they are categorized in the event hubs 300-300m according to their respective types. The data item scanning service 120 as shown in FIG. 3 or another service (not shown) may organize the data items 130a-130n into the event hubs 300a-300m. The event hubs 300a-300m may organize the data items 130a-130n according to the types of the data items 130a-130n. For instance, a first event hub 300a may include data items 302a that include HTML files, a second event hub 300b may include data items 302b that include PDF files, a third event hub 300c may include data items 302c that include word processing files, a fourth event hub 300d may include data items 302d that include executable files, a fifth event hub 300e may include data items 302e that include URLs, and so forth.

The processor 104 may execute the instructions 202 to determine similarities and/or patterns in the identified features 132 of the data items 130a-130n. Equivalently, the processor 104 may execute the instructions 202 to determine similarities and/or patterns in identified featurizations and/or hashes of the features 132 of the data items 130a-130n. For instance, the processor 104 may determine which of the data items 130a-130n have features 132 that are similar to each other and/or whether there are certain patterns among the features 132. The processor 104 may make these determinations through implementation of any suitable technique. By way of example, the processor 104 may determine whether some of the data items 130a-130n include URL links that share a common host or domain, that share a common sender, that share a common subject, and/or the like. As an example of a pattern among the features 132, the processor 104 may determine whether some of the data items 130a-130n were sent from a common sender to certain recipients within a certain time window and to other recipients within another time window.

The processor 104 may execute the instructions 204 to group the data items 130a-130n into a plurality of clusters 110 of data items 130a-130n based on the determined similarities and/or patterns in the identified features in the plurality of data items 130a-130n. For instance, the processor 104 may group the data items 130a-130n that are determined to have features 132 that meet a predefined similarity level with respect to each other. The processor 104 may also or alternatively group the data items 130a-130n that are determined to have features 132 that have common patterns with respect to each other. The processor 104 may employ any suitable clustering technique to group the data items 130a-130n into the clusters 110. For instance, the processor 104 may employ a machine-learning technique, such as unsupervised learning or other suitable technique, to organize the data items 130a-130n into groups whose members are similar in some way based on the features 132 in the data items 130a-130n.

In any of these examples, the processor 104 may store the clusters 110 in a data store 108. The data store 108 may be a Random Access memory (RAM), an Electrically Erasable Programmable Read-Only Memory (EEPROM), a storage device, or the like.

The processor 104 may execute the instructions 206 to evaluate the generated clusters 110 to identify a potentially malicious pattern among the data items 130a-130n in the generated clusters 110. For instance, the processor 104 may apply policies on the generated clusters 110 to determine whether any of the clusters 110 includes data items 130a-130n that may correspond to a potentially malicious pattern. By way of example, the processor 104 may determine that the data items 130a-130n in a certain cluster 110 may follow a potentially malicious pattern in the event that the data items 130a-130n include certain types of features 132 that have been identified as potentially being malicious, which may be defined in a set of policies. The policies may be developed based on, for instance, experiences of security analysts, historical data, testing, simulations, modeling, and/or the like. The processor 104 may determine that the data items 130a-130n in a certain cluster 110 may follow a potentially malicious pattern from the features 132 included in the certain cluster 110. For instance, the processor 104 may determine that a certain number of the data items 130a-130n includes a certain feature 132, e.g., a common host domain, a common URL, a common header, and/or the like.

In examples in which the data items 130a-130n have been categorized into the event hubs 300a-300m as discussed above with respect to FIG. 3, the processor 104 may apply a first clustering logic 310 on the data items 302a in the first event hub 300a to group the data items 302a in the first event hub 300a into first clusters 320 of the data items 302a. In addition, the processor 104 may apply a second clustering logic 312 on the data items 302b in the second event hub 302b to group the data items 302b in the second event hub 300b into second clusters 322 of the data items 302b. The processor 104 may additionally apply other respective clustering logic to the data items 302c-303m in the remaining event hubs 300c-300m to group the data items 302c-302m in the event hubs 300c-300m into other respective clusters. According to examples, each of the clustering logics may be tuned for the types of data items 302a-302m included in the event hubs 300a-300m. Thus, for instance, the clustering logic, e.g., the manner in which the data items 302a within an event hub 300a are clustered into the groups, may vary for data items 302a that include PDF files as compared with the clustering logic for data items 302m that include executable files.

Additionally, the processor 104 may evaluate the first clusters 320 separately from the second clusters 322 to identify potentially malicious patterns among the data items 302a in the first clusters 320 and among the data items 302b in the second clusters 322. The processor 104 may also evaluate the remaining clusters separately to identify potentially malicious patterns among the data items 302c-302m in the remaining clusters.

The processor 104 may execute the instructions 208 to, based on a potentially malicious pattern being identified in a generated cluster 110 of the generated clusters 110, execute an action with regard to the data items 130a-130n. By way of non-limiting example, the action may include an output of a notification to request additional analysis on the data items 130a-130n in the generated cluster 110. For instance, the processor 104 may output a request for a human analyst to analyze the data items 130a-130n in the generated cluster 110 to make a determination as to whether the potentially malicious pattern is likely malicious or not. As another example, the action may include an action to remove the data items 130a-130n in the generated cluster 110 from a device of a recipient (or from multiple devices of multiple recipients) of the data items 130a-130n in the generated cluster 110. The processor 104 may remove the data items 130a-130n from the recipient's device by, for instance, recalling the data items 130a-130m and/or deleting the data items 130a-130n from the recipient's device.

In some examples, prior to executing the action, the processor 104 may determine whether the particular action is to be performed. For instance, the processor 104 may determine a degree of the identified potentially malicious pattern, in which the degree of the identified potentially malicious pattern may be a severity and/or a threat level posed by the identified potentially malicious pattern. In these examples, the processor 104 may execute the action based on the determined degree of the identified potentially malicious pattern exceeding a predefined degree. In other examples, the processor 104 may execute a first action based on the determined degree of the identified potentially malicious pattern exceeding a first predefined degree, a second action based on the determined degree of the identified potentially malicious pattern exceeding a second predefined degree, and so forth. For instance, the processor 104 may output the notification to request the additional analysis based on the determined degree of the identified potentially malicious pattern exceeding the first predefined degree and may remove the data items 130a-130n from the recipient's device based on the determined degree of the identified potentially malicious pattern exceeding the second predefined degree.

The processor 104 may aggregate the generated clusters 110 into a reduced number of clusters based on the identified features in the plurality of data items 130a-130n grouped in the generated clusters 110. For instance, the processor 104 may execute a machine-learning algorithm to identify clusters 110 that meet certain criteria with respect to each other.

In other words, the processor 104 may combine the clusters 110 that have similarities and/or patterns to, for instance, reduce the number of clusters 110 that the processor 104 may evaluate to identify potentially malicious patterns in the clusters 110.

In some examples, the processor 104 may determine that a potentially malicious pattern has been identified at least a predefined number of times. In addition, based on the determination that the potentially malicious pattern has been identified at least a predefined number of times, the processor 104 may update a service that is to perform antivirus operations on the plurality of data items 130a-130n as the plurality of data items 130a-130n are received regarding the potential malicious pattern. The predefined number of times may be user defined, based on testing, based on modeling, based on simulations, and/or the like. In addition, the service may be the data item scanning service 120, which may use the update to perform security analysis on the data items 130a-130n.

Figure 4:
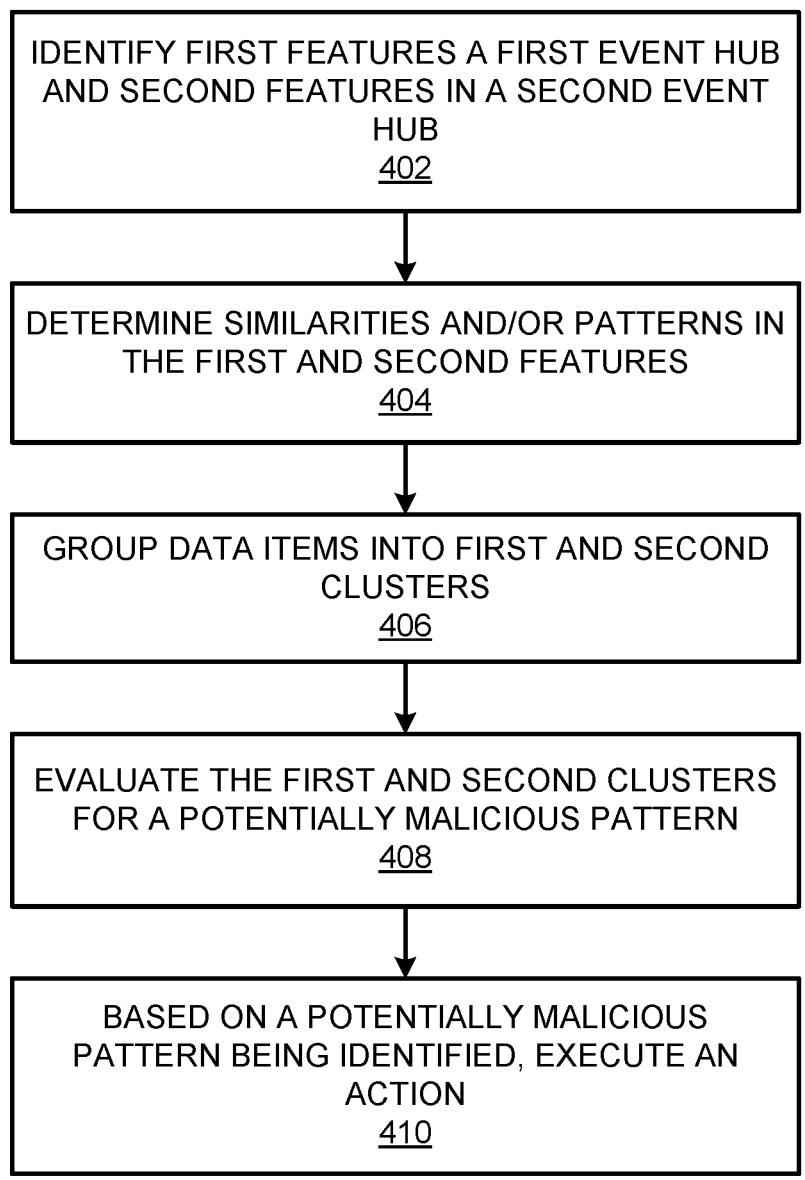
FIG. 4 depicts a flow diagram of a method for identifying a potentially malicious pattern in a cluster of event hubs and for executing an action based on an identification of a potentially malicious pattern in the cluster, in accordance with an embodiment of the present disclosure.

Various manners in which the processor 104 of the apparatus 102 may operate are discussed in greater detail with respect to the method 400 depicted in FIG. 4. Particularly, FIG. 4 depicts a flow diagram of a method 400 for identifying a potentially malicious pattern in a cluster of event hubs and for executing an action based on an identification of a potentially malicious pattern in the cluster, in accordance with an embodiment of the present disclosure. It should be understood that the method 400 may include additional operations and that some of the operations described therein may be removed and/or modified without departing from the scope of the method 400. The description of the method 400 is made with reference to the features depicted in FIGS. 1-3 for purposes of illustration.

At block 402, the processor 104 may identify first features 132 in first data items 302a in a first event hub 300a and second features 132 in second data items 302b in a second event hub 300b. The processor 104 may identify the first features 132 and the second features 132 that were received within predefined windows of time. At block 404, the processor 104 may determine first similarities and/or first patterns in the first features 132 and second similarities and/or second patterns in the second features 132. As discussed herein, the first and second features 132 may be hashes of the first and second features 132. In these instances, the processor 104 may identify the hashes of the first features 132 and the second features 132. In addition, the processor 104 may determine first similarities and/or first patterns in the hashes of the first features 132 and second similarities and/or second patterns in hashes of the second features 132.

At block 406, the processor 104 may group the first data items 302a into first clusters 320 based on the determined first similarities and/or first patterns and the second data items 302b into second clusters 322 based on the determined second similarities and/or second patterns. In some examples, the processor 104 may aggregate the generated first clusters 320 into a reduced number of first clusters 320 based on the identified features in the first data items 302a grouped in the first clusters 320.

A block 408, the processor 104 may evaluate the first clusters 320 and the second clusters 322 to identify a potentially malicious pattern among the first and second data items 302a, 302b respectively in the first clusters 320 and/or the second clusters 322. At block 410, the processor 104 may, based on a potentially malicious pattern being identified in the first clusters 320, execute an action with regard to the first data items 302a. Likewise, the processor 104 may, based on a potentially malicious pattern being identified in the second clusters 322, execute an action with regard to the second data items 302b.

As discussed herein, the processor 104 may determine a degree of the identified potentially malicious pattern and may determine the action to be performed based on the determined degree of the identified potentially malicious pattern. That is, for instance, the processor 104 may determine that a notification to request additional analysis is to be outputted, determine that the first data items 302a are to be removed, and/or the like. In addition or alternatively, the processor 104 may determine that the potentially malicious pattern has been identified at least a predefined number of times and, based on the determination that the potentially malicious pattern has been identified at least a predefined number of times, update a service that is to perform antivirus operations on additional data items 130a-130n as the additional data items 130a-130n are received regarding the potential malicious pattern.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
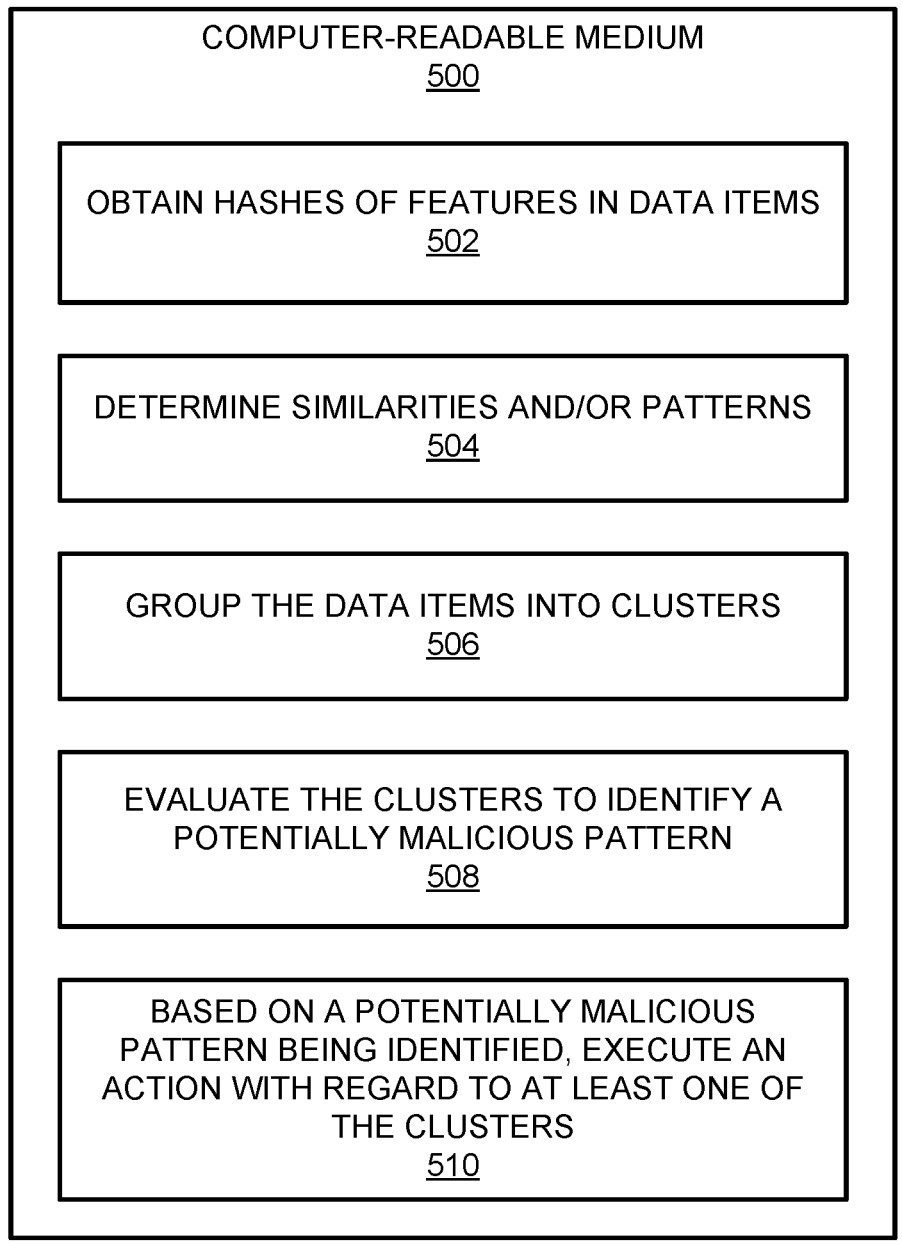
FIG. 5 shows a block diagram of a computer-readable medium that may have stored thereon computer-readable instructions for executing an action with regard to data items in at least one generated cluster of data items based on a potentially malicious pattern being identified in the at least cluster, in accordance with an embodiment of the present disclosure.

Turning now to FIG. 5, there is shown a block diagram of a computer-readable medium 500 that may have stored thereon computer-readable instructions for executing an action with regard to data items in at least one generated cluster of data items based on a potentially malicious pattern being identified in the at least cluster, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-510 that a processor, such as the processor 104 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to obtain hashes of features 132 in data items 130a-130n from a data item scanning service 120. The processor may fetch, decode, and execute the instructions 504 to determine similarities and/or patterns in the obtained hashes of the features 132. The processor may fetch, decode, and execute the instructions 506 to group the data items 130a-130n into a plurality of clusters 110 of data items 130a-130n based on the determined similarities and/or patterns in the obtained hashes of the features 132. The processor may fetch, decode, and execute the instructions 508 evaluate the plurality of clusters 110 to identify a potentially malicious pattern among the data items 130a-130n in the plurality of clusters 110. The processor may fetch, decode, and execute the instructions 510 to, based on a potentially malicious pattern being identified in at least one cluster 110 of the plurality of clusters, execute an action with regard to the data items 130a-130n in the at least one cluster.

As discussed herein, the processor may execute the action by outputting a notification to request that additional analysis be applied on the data items 130a-130n in the at least one cluster 110. In addition, or alternatively, the processor may execute the action by removing the data items 130a-130n from a device of a recipient of the data items 130a-130n in the at least one cluster 110.

As also discussed herein, the data items 130a-130n may be categorized into event hubs 300a-300m by types of the data items 130a-130n. In these examples, the processor may apply a first clustering logic 310 on the data items 302a in a first event hub 300a of the event hubs 300a-300m to group the plurality of data items 302a in the first event hub 300a into a first plurality of clusters 320. In addition, the processor may apply a second clustering logic 312 on the plurality of data items in a second event hub 300b of the event hubs 300-300m to group the plurality of data items 302b in the second event hub 300n into a second plurality of clusters 322. In the processor may further evaluate the first plurality of clusters 320 separately from the second plurality of clusters 322 to identify potentially malicious patterns in the first plurality of clusters 320 and the second plurality of clusters 322.

As further discussed herein, the processor may determine that the potentially malicious pattern has been identified at least a predefined number of times. In addition, the processor may, based on the determination that the potentially malicious pattern has been identified at least a predefined number of times, update the data item scanning service 120 regarding the potential malicious pattern.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   identify features in a plurality of messages communicated between senders and receivers, wherein the identified features include information related to the senders of the plurality of messages;
   determine common patterns in the identified features in the plurality of messages, including identifying messages that were received from a same sender within a predefined time window;

group the plurality of messages into a plurality of clusters based on the common patterns in the identified features in the plurality of messages;

evaluate the plurality of clusters separately from one another to identify a potentially malicious pattern among the messages in one or more of the plurality of clusters, wherein a potentially malicious pattern is identified in a particular cluster when, in the particular cluster, a count of the messages that were received from the same sender within the predefined time window exceeds a threshold number; and based on the potentially malicious pattern being identified in the particular cluster, execute an action with regard to the messages in the particular cluster, wherein the action comprises one of notification or removal of specific messages from the particular cluster.

2. The apparatus of claim 1, wherein the features comprise hashes of the features, and wherein the instructions cause the processor to:

identify the hashes of the features; and determine the common patterns of the identified hashes of the features.

3. The apparatus of claim 1, wherein the instructions cause the processor to:

identify the features in the plurality of messages that were received within predefined windows of time.

4. The apparatus of claim 1, wherein the plurality of messages are categorized into event hubs by types of the messages, and wherein the instructions cause the processor to:

apply a first clustering logic on the plurality of messages in a first event hub of the event hubs to group the plurality of messages in the first event hub into a first plurality of clusters;

apply a second clustering logic on the plurality of messages in a second event hub of the event hubs to group the plurality of messages in the second event hub into a second plurality of clusters; and evaluate the first plurality of clusters separately from the second plurality of clusters to identify potentially malicious patterns in the first plurality of clusters and the second plurality of clusters.

5. The apparatus of claim 1, wherein the instructions cause the processor to:

determine a degree of the identified potentially malicious pattern; and determine the action to be executed based on the determined degree of the identified potentially malicious pattern.

6. The apparatus of claim 1, wherein the instructions cause the processor to:

based on the potentially malicious pattern being identified in the particular cluster, determine whether the notification to request additional analysis is to be outputted; and based on a determination that the notification is to be outputted, execute the action to output the notification.

7. The apparatus of claim 1, wherein the instructions cause the processor to:

based on the potentially malicious pattern being identified in the particular cluster, determine whether the specific messages in the particular cluster are to be removed; and based on a determination that the specific messages in the particular cluster are to be removed, execute the action to remove the specific messages from the particular cluster.

8. The apparatus of claim 1, wherein the instructions cause the processor to:

aggregate the plurality of clusters into a reduced number of clusters based on the identified features in the plurality of messages grouped in the plurality of clusters.

9. The apparatus of claim 1, wherein the instructions cause the processor to:

determine that the potentially malicious pattern has been identified in at least a predefined number of clusters; and based on the determination that the potentially malicious pattern has been identified in at least the predefined number of clusters, update a service that is to perform antivirus operations on the plurality of messages as the plurality of messages are received regarding the potential malicious pattern.

10. A method comprising:

identifying, by a processor, first features in first messages in a first event hub and second features in second messages in a second event hub, wherein the first and second messages are first and second types of communications between senders and receivers, and wherein the first and second features include information related to the senders of the first and second messages;

determining, by the processor, first patterns in the first features and second patterns in the second features, including identifying that the first messages were received from a same sender within a predefined time window;

grouping, by the processor, the first messages into first clusters based on the first patterns and the second messages into second clusters based on the second patterns;

evaluating, by the processor, the first clusters and the second clusters separately from one another to identify a potentially malicious pattern among the first and second messages in one or more of the first clusters and the second clusters, wherein a potentially malicious pattern is identified in the first clusters when, in the first clusters, a count of the first messages that were received from the same sender within the predefined time window exceeds a threshold number; and based on the potentially malicious pattern being identified in the first clusters, executing, by the processor, an action with regard to the first messages in the first clusters, wherein the action comprises one of notification or removal of the first messages from the first clusters.

11. The method of claim 10, wherein the first features and the second features comprise respective hashes of the first features and the second features, and wherein the method further comprises:

identifying the respective hashes of the first features and the second features; and determining the first patterns in the respective hashes of the first features and the second patterns in hashes of the second features.

12. The method of claim 10, wherein identifying the second features in the second messages includes identifying the second messages that were received from the same sender within the predefined time window.

13. The method of claim 10, further comprising:
determining a degree of the identified potentially malicious pattern; and
determining the action to be executed based on the determined degree of the identified potentially malicious pattern.

14. The method of claim 10, wherein determining the action to be executed on the first messages further comprises:
determining that the notification to request additional analysis is to be outputted; and
determining that the first messages are to be removed.

15. The method of claim 10, further comprising:
aggregating the first clusters into a reduced number of first clusters based on the identified features in the first messages grouped in the first clusters.

16. The method of claim 10, further comprising:
determining that the potentially malicious pattern has been identified in at least a predefined number of clusters; and
based on the determination that the potentially malicious pattern has been identified in at least the predefined number of clusters, updating a service that is to perform antivirus operations regarding the potential malicious pattern on additional messages as the additional messages are received.

17. A non-transitory computer-readable medium on which is stored computer-readable instructions that when executed by a processor, cause the processor to:
identify features in messages communicated between senders and receivers, wherein the identified features include information related to the senders of the messages;
determine common patterns in the identified features of the messages, including identifying messages that were received from a same sender within a predefined time window;
group the messages into a plurality of clusters based on the determined common patterns in the identified features of the messages;
evaluate the plurality of clusters separately from one another to identify a potentially malicious pattern among the messages in one or more of the plurality of clusters, wherein a potentially malicious pattern is identified in a particular cluster when, in the particular cluster, a count of the messages that were received from the same sender within the predefined time window exceeds a threshold number; and
based on the potentially malicious pattern being identified in the particular cluster, execute an action with regard to the messages in the particular cluster, wherein the action comprises one of notification or removal of specific messages from the particular cluster.

18. The non-transitory computer-readable medium of claim 17, wherein the messages are categorized into event hubs by types of the messages, wherein the instructions further cause the processor to:
apply a first clustering logic on the messages in a first event hub of the event hubs to group the messages in the first event hub into a first plurality of clusters; and
apply a second clustering logic on the messages in a second event hub of the event hubs to group the messages in the second event hub into a second plurality of clusters; and
evaluate the first plurality of clusters separately from the second plurality of clusters to identify potentially malicious patterns in the first plurality of clusters and the second plurality of clusters.

19. The non-transitory computer-readable medium of claim 17, wherein to execute the action, the instructions further cause the processor to:
output the notification to request that additional analysis be applied on the messages in the particular cluster; or
remove the specific messages from the particular cluster.

20. The non-transitory computer-readable medium of claim 17, wherein the instructions further cause the processor to:
determine that the potentially malicious pattern has been identified in at least a predefined number of clusters; and
based on the determination that the potentially malicious pattern has been identified in at least the predefined number of clusters, update a service that is to perform antivirus operations on additional messages regarding the potential malicious pattern.

* * * * *